United States Patent
Milanese et al.

(10) Patent No.: US 9,667,708 B1
(45) Date of Patent: May 30, 2017

(54) BOOST ORCHESTRATOR FOR CLIENT-SERVER ARCHITECTURES

(71) Applicant: International Business Machines Corporation, Armonk, NY (US)

(72) Inventors: Nicola Milanese, Rome (IT); Stefano Sidoti, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/983,868

(22) Filed: Dec. 30, 2015

(51) Int. Cl.
  H04L 29/08 (2006.01)
  H04L 29/06 (2006.01)
  H04L 12/26 (2006.01)

(52) U.S. Cl.
  CPC ............ H04L 67/10 (2013.01); H04L 43/103 (2013.01); H04L 43/16 (2013.01); H04L 67/42 (2013.01); H04L 43/0876 (2013.01)

(58) Field of Classification Search
  CPC ..... H04L 67/10; H04L 67/42; H04L 43/0876; H04L 43/106
  See application file for complete search history.

(56) References Cited

U.S. PATENT DOCUMENTS

| | | | | |
|---|---|---|---|---|
| 6,249,836 B1 * | 6/2001 | Downs | .................. | G06F 9/5044 703/27 |
| 7,406,691 B2 * | 7/2008 | Fellenstein | ............... | G06F 9/50 706/45 |
| 7,430,628 B2 * | 9/2008 | Garg | ...................... | G06F 3/1203 710/200 |
| 7,516,455 B2 * | 4/2009 | Matheson | .............. | G06Q 10/06 709/238 |
| 7,548,977 B2 | 6/2009 | Agapi et al. | | |
| 8,014,308 B2 * | 9/2011 | Gates, III | ................ | H04L 12/66 370/252 |
| 8,838,797 B2 * | 9/2014 | Wolfe | ................... | G06F 9/5044 709/203 |
| 2009/0227251 A1 * | 9/2009 | Lei | ...................... | H04L 41/5067 455/425 |
| 2011/0066841 A1 | 3/2011 | Goodrow et al. | | |
| 2011/0137909 A1 | 6/2011 | Guertler et al. | | |

(Continued)

FOREIGN PATENT DOCUMENTS

GB          5475087 B  *  5/2011  ............... G06F 9/50

OTHER PUBLICATIONS

Plasmeijer et al. "Declarative Ajax and Client Side Evaluation of Workflows using iTasks." PPDP ACM 2008. (11 pgs).

*Primary Examiner* — Patrice Winder
(74) *Attorney, Agent, or Firm* — Cantor Colburn LLP

(57) ABSTRACT

Embodiments are directed to a computer implemented method of defining and executing tasks in a client-server architecture. The method includes receiving, at a server, a definition of a task to be performed by a client, wherein the definition of the task includes a set of client properties relevant to the task. The method further includes repeatedly receiving, at the server, reports of the client, wherein each of the reports comprises a status of each of a plurality of client properties. The method further includes determining, at the server, a characteristic of the set of client properties based at least in part on the reports, and determining, at the server, a level of service for executing the task based at least in part on the characteristic of the set of client properties.

20 Claims, 4 Drawing Sheets

(56) References Cited

U.S. PATENT DOCUMENTS

| | | | | |
|---|---|---|---|---|
| 2011/0208810 A1* | 8/2011 | Li | .......................... | H04L 67/02 709/203 |
| 2014/0181839 A1* | 6/2014 | Xu | ....................... | G06F 9/5088 718/107 |

* cited by examiner ns of the
BOOST ORCHESTRATOR FOR CLIENT-SERVER ARCHITECTURES

BACKGROUND

The present disclosure relates in general to client-server architectures and devices. More specifically, the present disclosure relates to systems and methodologies for improving the provisioning and life cycle management of client-server architectures and devices.

A client-server architecture is a network architecture in which each computer or process on the network is either a client or a server. Servers are powerful computers or processes dedicated to managing disk drives, printers or network traffic. Clients are typically personal computers (PCs) or workstations on which users run software programs/applications. Clients typically rely on servers for resources, such as files, devices and even processing power.

As used in the present disclosure, the term architecture is not simply a description of the computer system hardware. Instead, architecture refers to the portions of a computer system that a software program running on the system in effect "sees." Thus, architecture refers to things like memory addresses, registers, instructions, condition codes and the like. In other words, a computer system architecture may be thought of as the various "states" of the computer system that a software program can manipulate.

There are two main types of configurations for client-server architectures, applications and/or hardware. In the first type of configuration, which is referred to herein as a server-centric (SC) configuration, all intelligence is resident with the server, and all operations are triggered by the server. Examples of a SC configuration include older generation client-server architectures such as the tivoli provisioning manager (TPM) or the tivoli configuration manager (TCM). In the second type of configuration, which is referred to herein as a client-centric (CC) configuration, significant portions of the server intelligence are shifted to the client, and also significant portions of the system's operations are triggered by the client. Examples of a CC configuration include new generation client-server architectures such as the IBM endpoint manager (IEM).

In a typical SC configuration, an operator/user starts a task from the server. Tasks are any operation/instruction or sequence of operations/instructions capable of being executed by a client. The task is sent to and executed on the client, and the results are sent back to the server. A disadvantage of this technique is that the client status information evaluated at the server before starting a task could be old due to the time delay between when client status information is evaluated at the server and when the related task is executed on the client. In an attempt to overcome this disadvantage, more recent SC configurations execute tasks according to a schedule, and the resulting time delay is proportional to the frequency of the schedule. For example, hardware and software inventory scans are executed in order to retrieve information about the status of the client. Usually, these scans are scheduled in order to provide information that is as accurate as possible. The information is stored in the server database. When a task is sent from the server it is only sent to those clients that match the applicability condition of the task. The matching is accomplished by looking at the server database. However, the information on in the server database might not be accurate because it is possible that something has changed since the last inventory scan. Thus, scans must be scheduled at a frequency that provides the desired level of system performance. For example, it may provide an acceptable level of system performance to conduct hardware scans weekly, while software scans may need to be conducted daily.

In a typical CC configuration, significant portions of the server intelligence are shifted to the client. These intelligent clients receive from the server the instructions of a task, and the intelligent client runs the task whenever it is needed based on a so-called applicability statement that is continuously checked. This improves the accuracy of client status information on the server. However, there is still the need to wait for the applicability condition to be sent and executed on the client, which is referred to herein as operational time. These operational times, however, depend on many factors such as the efficiency of the client and the size of the client-server environment. Accordingly, the net effect is that even in a CC configuration, operational times contribute to the time it takes to complete a task.

In some cases, even operational time delays can result in an unacceptable level of performance. For example, when an operator is running a demonstration before an audience, any perceptible delays can reflect negatively on the demonstration. Moreover, in a typical CC configuration, all operations pass through the client despite the fact that for some tasks the information already available on the server is accurate enough to provide an acceptable level of performance.

Accordingly, it would be beneficial to provide systems and methodologies for dynamically matching the level of performance/service in a client-server architecture to a given task.

SUMMARY

Embodiments are directed to a computer implemented method of defining and executing tasks in a client-server architecture. The method includes receiving, at a server, a definition of a task to be performed by a client, wherein the definition of the task includes a set of client properties relevant to the task. The method further includes repeatedly receiving, at the server, reports of the client, wherein each of the reports comprises a status of each of a plurality of client properties. The method further includes determining, at the server, a characteristic of the set of client properties based at least in part on the reports, and determining, at the server, a level of service for executing the task based at least in part on the characteristic of the set of client properties.

Embodiments are further directed to a computer system for defining and executing tasks in a client-server architecture. The system includes a server having a memory and a processor system communicatively coupled to the memory, wherein the processor system is configured to perform a method including receiving a definition of a task to be performed by a client, wherein the definition of the task includes a set of client properties relevant to the task. The method further includes repeatedly receiving reports of the client, wherein each of the reports comprises a status of each of a plurality of client properties. The method further includes determining a characteristic of the set of client properties based at least in part on the reports, and determining a level of service for executing the task based at least in part on the characteristic of the set of client properties.

Embodiments are further directed to a computer program product for defining and executing tasks in a client-server architecture. The computer program product includes a computer readable storage medium having program instructions embodied therewith, wherein the computer readable storage medium is not a transitory signal per se. The program instructions are readable by a processor system of a server to cause the processor system to perform a method. The method includes receiving a definition of a task to be performed by a client, wherein the definition of the task includes a set of client properties relevant to the task. The method further includes repeatedly receiving reports of the client, wherein each of the reports comprises a status of each of a plurality of client properties. The method further includes determining a characteristic of the set of client properties based at least in part on the reports, and determining a level of service for executing the task based at least in part on the characteristic of the set of client properties.

Additional features and advantages are realized through the techniques described herein. Other embodiments and aspects are described in detail herein. For a better understanding, refer to the description and to the drawings.

BRIEF DESCRIPTION OF THE DRAWINGS

The subject matter which is regarded as the present disclosure is particularly pointed out and distinctly claimed in the claims at the conclusion of the specification. The foregoing and other features and advantages are apparent from the following detailed description taken in conjunction with the accompanying drawings in which:

Figure 1:
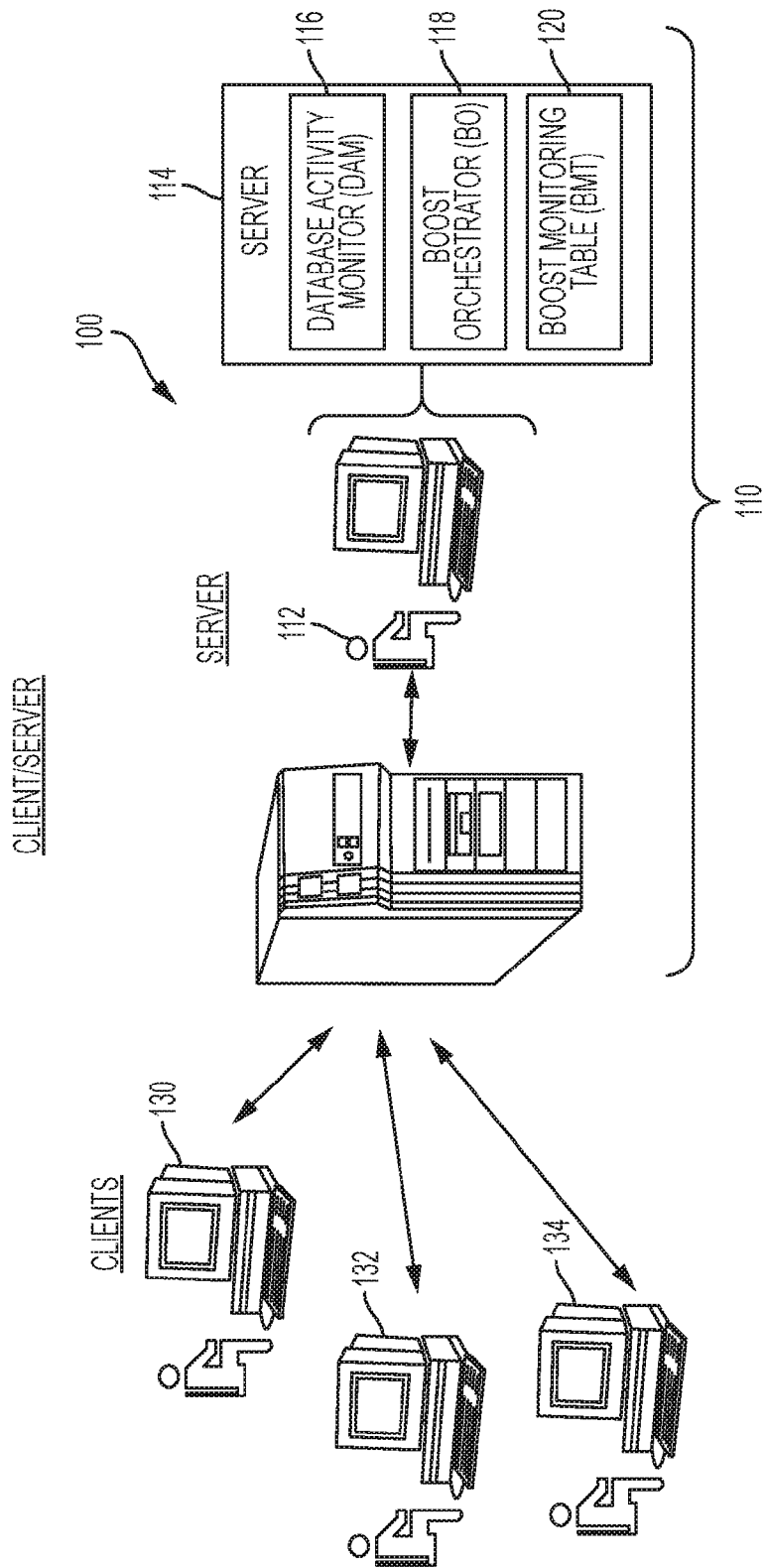
FIG. 1 depicts an exemplary client-server architecture capable of implementing one or more embodiments.

In the accompanying figures and following detailed description of the disclosed embodiments, the various elements illustrated in the figures are provided with three or four digit reference numbers. The leftmost digit(s) of each reference number corresponds to the figure in which its element is first illustrated.

DETAILED DESCRIPTION

Various embodiments of the present disclosure will now be described with reference to the related drawings. Alternate embodiments may be devised without departing from the scope of this disclosure. It is noted that various connections are set forth between elements in the following description and in the drawings. These connections, unless specified otherwise, may be direct or indirect, and the present disclosure is not intended to be limiting in this respect. Accordingly, a coupling of entities may refer to either a direct or an indirect connection.

Additionally, it is understood in advance that although this disclosure includes a detailed descriptions of client-server architectures, implementation of the teachings recited herein are not limited to a particular client-server architecture. Rather, embodiments of the present disclosure are capable of being implemented in conjunction with any other type of client-server architecture and/or connected computing environment now known or later developed.

Turning now to an overview of the present disclosure, one or more embodiments of the present disclosure provide systems and methodologies for dynamically matching the execution of a desired to task to an appropriate the level of performance/service of a client-server architecture. According to the present disclosure, clients of a client-server architecture continuously report client status information to the server, which automatically evaluates characteristics of the client status information, and then uses the characteristics to determine the appropriate level of performance/service required to complete a given task. The evaluation performed on characteristics of the client status information determines whether the client status information stored at the server is sufficiently accurate or sufficiently reliable. If it is determined that client status information stored at the server is sufficiently reliable, execution of the task at the server is boosted by allowing the client to infer, based on the above-described server evaluation, that for the subject task the client can simply execute the task and not devote time/resources to confirming the relevant client status information with the server.

Thus, the present disclosure provides a user of a client-server architecture with the capability to speed up the running of certain tasks in a safe and reliable way. The methodology of the present disclosure is run primarily on the server architecture. This allows a simple and efficient implementation of the disclosed methodology by reconfiguring the server without the need to reconfigure multiple disperse clients. Because the disclosed methodology relies on an evaluation of the accuracy of status reports received from clients, there is no need to incur the time and resources required to evaluate fixed client properties that must be retrieved from the client side at the time the task is run.

Turning now to a more detailed description of the present disclosure, FIG. 1 depicts a client-server architecture 100 capable of implementing one or more embodiments of the present disclosure. Client-server architecture 100 includes a plurality of clients 130, 132, 134 and a server 110, configured and arranged as shown. Server 110 includes a server architecture 114 having a database activity monitor (DAM) 116, a boost orchestrator (BO) 118 and a boost monitoring table (BMT) 120. Details of the hardware components of clients 130, 132, 134 and server 110 are illustrated by a computer system 300 shown in FIG. 3, which is described in detail later in this disclosure.

Information reported by clients 130, 132, 134 to server 110 is referred to herein as reports, wherein each report includes a set of named properties and the current values of the named properties. A task is any action, operation or instruction that is defined to run on one, some or all of clients 130, 132, 134. Examples of properties include RAM usage, CPU usage, total available/free memory, and the like. When a task is created by a task creator (e.g., operator/user 112), a set of properties is defined as relevant to the created task. In client-server architectures operating without benefit of the present disclosure, at the time a task is run, a so-called "task applicability" is evaluated by checking all the client values of all the properties defined as relevant to the task by the task creator. However, according to the present disclosure, client-server architecture 100 selectively boosts the task applicability evaluation of certain tasks so that the tasks identified for boosting can be performed by server 110 without the need for clients 130, 132, 134 to check all the client values of all the properties defined as relevant by the task creator. The task applicability evaluation is boosted according to the present disclosure by relying on the client values currently stored at server 110 for all the properties defined as relevant by the task creator, thereby eliminating the need to check, at the time the task is run, all the client values of all the properties defined as relevant by the task creator.

The present disclosure is carried out primarily at server 110, and more specifically through DAM 116, BO 118 and BMT 120 of server architecture 114. In one or more embodiments, DAM 116, BO 118 and BMT 120 are implemented through software applications running on server architecture 114. Accordingly, implementation of the present disclosure requires no changes to clients 130, 132, 134.

Initially, user 112 selects a task for boosting, and BO 118 begins an analysis of the task applicability of the selected task by reducing the selected task to its single property components. The single properties are then tagged, unless the properties were already tagged by a previous iteration of the present disclosure, and stored in a database (not shown) of server 110. As clients 130, 132, 134 continue reporting to server 110 during their normal life cycle, DAM 116 recognizes the tagged properties and follows their route to the database. Once a tagged property is inserted or updated in the database, DAM 116 recognizes the actual database rows and fields that changed, and performs a compare operation before and after the change. The changing fields are stored as a database object id set and hashed by a property id set. Hashing is the process of mapping large amount of data items to a smaller table with the help of a hashing function. The essence of hashing is to facilitate a search capability that is more effective than linear or binary searching. Another advantage of hashing is its efficiency at handling a vast amount of data items. The result of a hashing process is a hash data structure that can store or retrieve data items relatively quickly regardless of the collection size. Accordingly, for each tagged property there is a set of database objects where the property information is stored.

For each one of clients 130, 132, 134 selected for boost, once the database fields related to the tagged property are recognized, DAM 116 creates two database triggers for the tagged property. In particular, DAM 116 creates a trigger after each select statement against the object id set, and also creates a trigger after each update statement against the object id set. The results of these trigger activities are stored in BMT 120, which contains the required data for server architecture 114 to determine whether or not the task applicability can be boosted.

According to one or more embodiments, two examples of characteristics or indicators that may be evaluated and used to determine whether or not a task applicability can be boosted are a frequency factor and a minimum update time. The frequency factor is the ratio between the frequency of selects over the frequency of updates against an object id set. This reflects how much the data are used by the client within each update period. The minimum update time is the minimum number of times that the object id set is updated. This reflects how much the data changes during the normal client life cycle.

BO 118 compares the characteristics/indicators to threshold values configured by user 112, wherein the threshold values correspond to the desired level of service. If the indicator is a frequency factor, and the frequency factor is greater than the threshold value, this means the client is currently using these values often, even during an update interval. Accordingly, BO 118 boosts the task applicability evaluation. Similarly, if the indicator is a minimum update time, if the time passed from the last update is low compared to the minimum update time, this means the confidence level in the accuracy of the associated task applicability information currently resident at server 110 is high. Accordingly, BO 118 boosts the task applicability evaluation. When BO 118 determines that a task can be boosted, server 110 sends appropriate control signals to one, some or all of clients 130, 132, 134 to instruct them to immediately run the boosted task and not perform a task applicability evaluation for the boosted task.

In addition to tasks identified for boosting by user 112, client-server architecture 100 can apply the disclosed methodology to other tasks already available in client-server architecture 100 but not yet selected for boosting by user 112. This can be accomplished by leveraging DAM 116, BO 118 and BMT 120 to identify for user 112 the tasks having task applicability that overlap with the task applicability of a task that is already being monitored for boosting. For example, if user 112 enables task1 and task2 for boosting, and these tasks have a task applicability that contains properties p1, p2, p3 and p4, every other task having a task applicability containing one or all of p1, p2, p3 or p4 is automatically capable of being boosting. Accordingly, client-server architecture 100 may suggest to user 112 such additional tasks as candidates for boosting.

Figure 2:
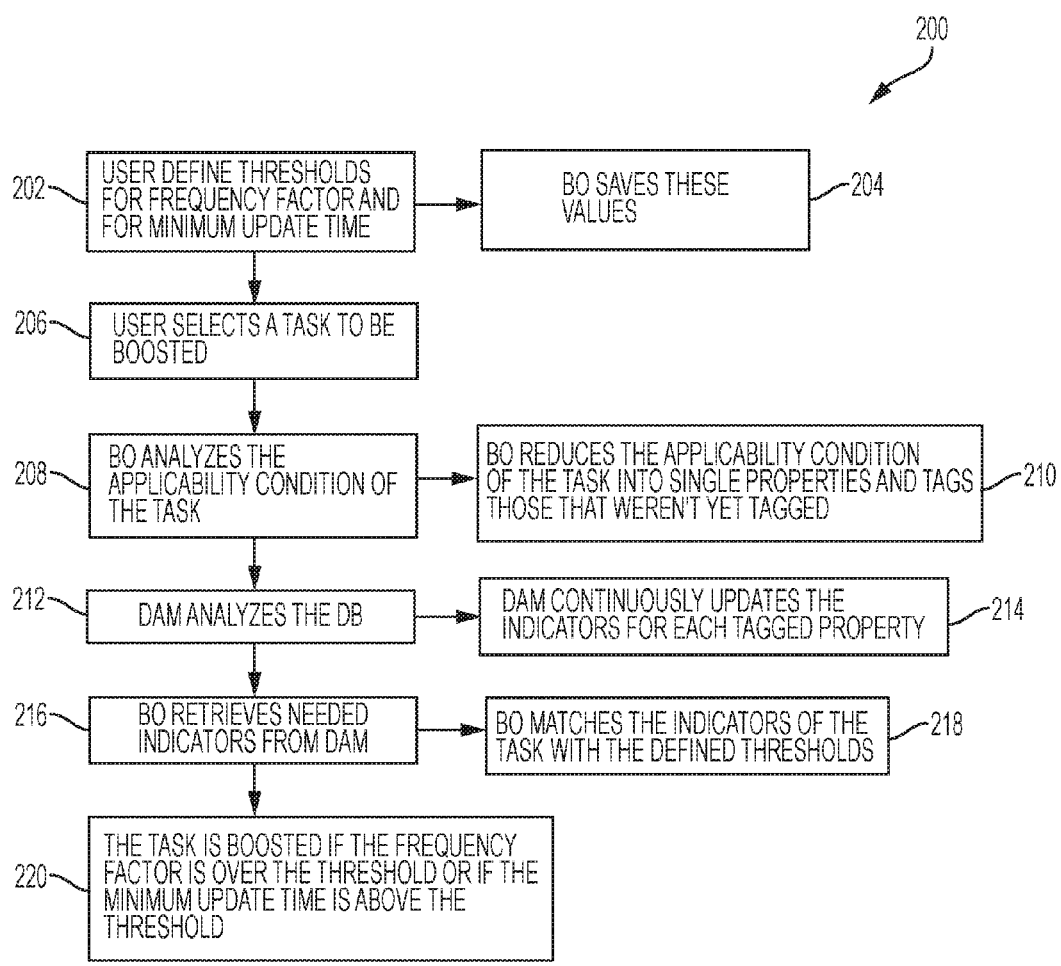
FIG. 2 depicts a flow diagram illustrating a methodology according to one or more embodiments.

FIG. 2 depicts a flow diagram illustrating a methodology 200 in accordance with the present disclosure. More specifically, methodology 200 depicts operations performed by server 110 shown in FIG. 1 according to one or more embodiments. The operations of methodology 200 are described below with reference to both methodology 200 shown in FIG. 2 and client-server architecture 100 shown in FIG. 1. Methodology 200 begins at block 202 with user 112 defining thresholds for the indicators/characteristics that will be monitored by methodology 200. In the illustrated example, the indicators are one or both of a frequency factor of the frequency updates of the client properties defined for the relevant task, or a minimum update time of the client properties defined for the relevant task. In block 204, BO 118 saves the threshold values. At block 206, user 112 selects a task to be boosted. At block 208, BO 118 analyzed the task applicability condition of the task that has been selected for boosting. At block 210, BO 118 reduces the task applicability condition of the task to be boosted into single properties. BO 118 then tags the identified properties that have not yet been tagged by other iterations of methodology 200 and stores the identified single properties in a database (DB).

At block 212, DAM 116 analyzes its associated DB, and in block 214, DAM 116 continuously updates the indicators for each of the tagged properties. At block 216, BO 118 retrieves the needed indicators from DAM 116, and at block 218, BO 118 matches the indicators of the task with the defined thresholds. In the illustrated example, the indicators are one or both of a frequency factor of the frequency updates of the client properties defined for the relevant task, or a minimum update time of the client properties defined for the relevant task. Accordingly, at block 220, methodology 200 boosts the task if the frequency factor is over its threshold, or if the minimum update time is above its threshold.

Figure 3:
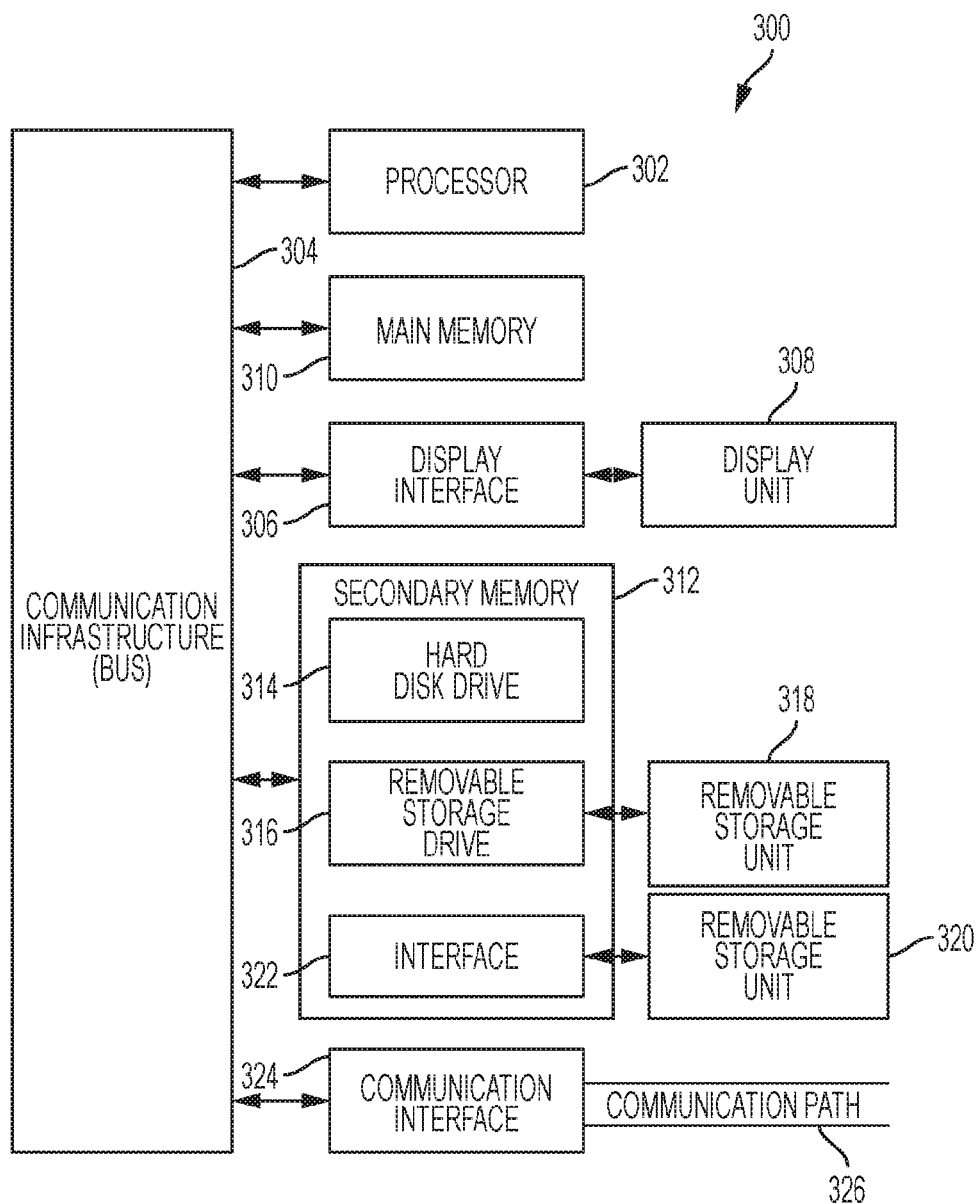
FIG. 3 depicts an exemplary computer system capable of implementing the client-server architecture shown in FIG. 1.

FIG. 3 depicts a high level block diagram computer system 300, which may be sued to implement one or more embodiments of the present disclosure. More specifically, computer system 300 may be used to implement clients 130, 132, 134 and server 110 shown in FIG. 1. Although one exemplary computer system 300 is shown, computer system 300 includes a communication path 326, which connects computer system 300 to additional systems (not depicted) and may include one or more wide area networks (WANs) and/or local area networks (LANs) such as the Internet, intranet(s), and/or wireless communication network(s). Computer system 300 and additional system are in communication via communication path 326, e.g., to communicate data between them.

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by removable storage drive 316. As will be appreciated, removable storage unit 318 includes a computer readable medium having stored therein computer software and/or data.

In alternative embodiments, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM, or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etcetera. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310 and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

It can be seen from the foregoing detailed description that the present disclosure provides a number of technical benefits. One or more embodiments of the present disclosure give a user of a client-server architecture the capability to accelerate the running of certain tasks in a safe and reliable way. The methodology of the present disclosure is run primarily on the server architecture, thus allowing the disclosed methodology to be implemented simply and efficiently by reconfiguring the server without the need to reconfigure multiple clients. Because the disclosed methodology relies on an evaluation of the accuracy of status reports received from clients, there is no need to incur the time and resources required to retrieve and evaluate fixed client properties from the client side at the time the task is run.

Figure 4:
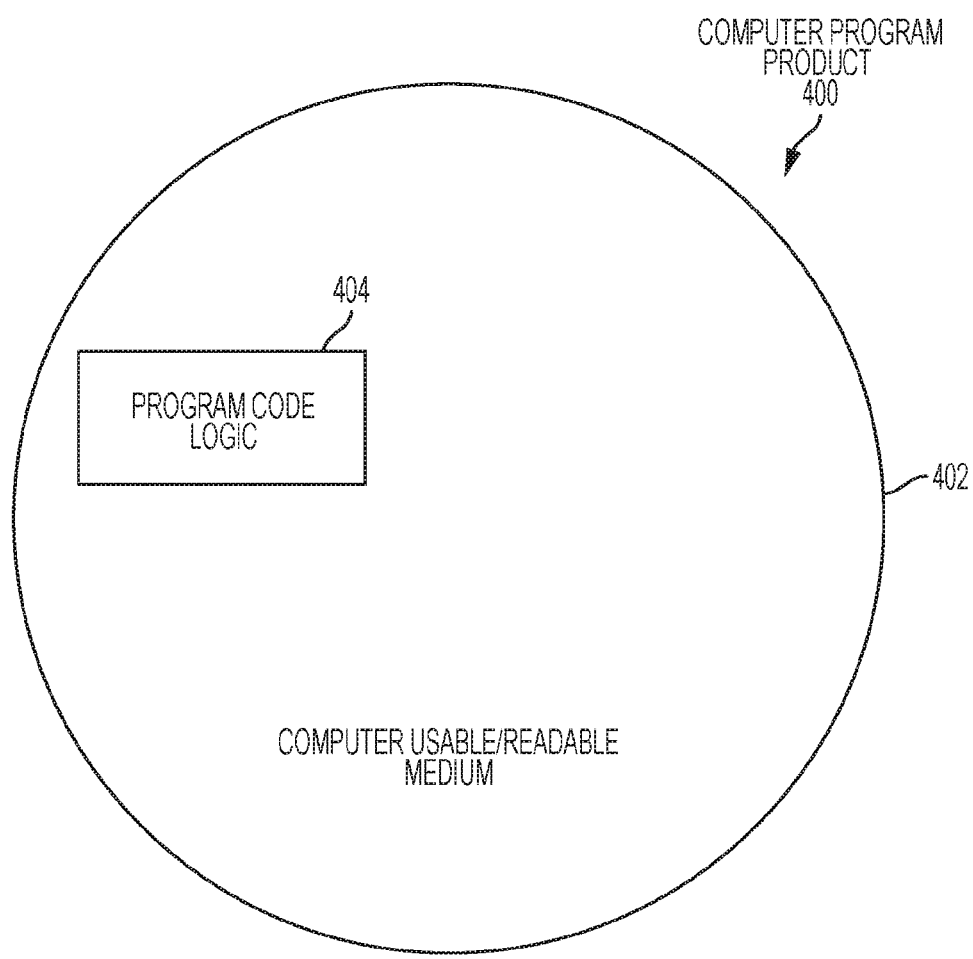
FIG. 4 depicts a computer program product in accordance with one or more embodiments.

Referring now to FIG. 4, a computer program product 400 in accordance with an embodiment that includes a computer readable storage medium 402 and program instructions 404 is generally shown.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

It will be understood that those skilled in the art, both now and in the future, may make various improvements and enhancements which fall within the scope of the claims which follow.

What is claimed is:

1. A computer implemented method of defining and executing tasks in a client-server architecture, the method comprising:

receiving, at a server, a definition of a task to be performed by a client, wherein the definition of the task includes a set of client properties relevant to the task;

repeatedly receiving, at the server, reports of the client, wherein each of the reports comprises a status of each of a plurality of client properties;

identifying ones of the plurality of client properties repeatedly received at the server that overlap the set of client properties relevant to the task;

storing over time, at the server, multiples instances of the status of the ones of the plurality of client properties repeatedly received at the server that overlap the set of client properties relevant to the task;

determining, at the server, a time-based characteristic of the set of client properties based at least in part on an evaluation of the stored multiple instances of the status of the ones of the plurality of client properties repeatedly received at the server, wherein the time-based characteristic represents patterns identified over time of the ones of the plurality of client properties repeatedly received at the server; and determining, at the server, a level of service for executing the task based at least in part on the time-based characteristic of the set of client properties.

2. The computer implemented method of claim 1, wherein determining the level of service comprises determining a first level of service if a value of the time-based characteristic is above a predetermined threshold.

3. The computer implemented method of claim 2, wherein:
the first level of service comprises a boosted level of service; and
the boosted level of service comprises executing the task using task applicability information of the set of client properties that is stored at the server at a time the task is run.

4. The computer implemented method of claim 3, wherein the time-based characteristic of the set of client properties comprises an update frequency.

5. The computer implemented method of claim 1, wherein determining the level of service comprises determining a secondary level of service if a value of the time-based characteristic is below a predetermined threshold.

6. The computer implemented method of claim 5, wherein:
the secondary level of service comprises a client-centric level of service; and
the client-centric level of service comprises executing the task by confirming task applicability information of the set of client properties at a time the task is run.

7. The computer implemented method of claim 6, wherein the time-based characteristic of the set of client properties comprises a minimum update time.

8. A computer system for defining and executing tasks in a client-server architecture, the system comprising:
a server having a memory and a processor system communicatively coupled to the memory, wherein the processor system is configured to perform a method comprising:
receiving a definition of a task to be performed by a client, wherein the definition of the task includes a set of client properties relevant to the task;
repeatedly receiving reports of the client, wherein each of the reports comprises a status of each of a plurality of client properties;
identifying ones of the plurality of client properties repeatedly received at the server that overlap the set of client properties relevant to the task;
storing over time, at the server, multiples instances of the status of the ones of the plurality of client properties repeatedly received at the server that overlap the set of client properties relevant to the task;
determining a time-based characteristic of the set of client properties based at least in part on an evaluation of the stored multiple instances of the status of the ones of the plurality of client properties repeatedly received at the server, wherein the time-based characteristic represents patterns identified over time of the ones of the plurality of client properties repeatedly received at the server; and
determining a level of service for executing the task based at least in part on the time-based characteristic of the set of client properties.

9. The computer system of claim 8, wherein determining the level of service comprises determining a first level of service if a value of the time-based characteristic is above a predetermined threshold.

10. The computer system of claim 9, wherein:
the first level of service comprises a boosted level of service; and
the boosted level of service comprises executing the task using task applicability information of the set of client properties that is stored at the server at a time the task is run.

11. The computer system of claim 10, wherein the time-based characteristic of the set of client properties comprises an update frequency.

12. The computer system of claim 8, wherein determining the level of service comprises determining a secondary level of service if a value of the time-based characteristic is below a predetermined threshold.

13. The computer system of claim 12, wherein:
the secondary level of service comprises a client-centric level of service; and
the client-centric level of service comprises executing the task by confirming task applicability information of the set of client properties at a time the task is run.

14. The computer system of claim 13, wherein the time-based characteristic of the set of client properties comprises a minimum update time.

15. A computer program product for defining and executing tasks in a client-server architecture, the computer program product comprising:
a computer readable storage medium having program instructions embodied therewith, wherein the computer readable storage medium is not a transitory signal per se, the program instructions readable by a processor system of a server to cause the processor system to perform a method comprising:
receiving a definition of a task to be performed by a client, wherein the definition of the task includes a set of client properties relevant to the task;
repeatedly receiving reports of the client, wherein each of the reports comprises a status of each of a plurality of client properties;
identifying ones of the plurality of client properties repeatedly received at the server that overlap the set of client properties relevant to the task;
storing over time, at the server, multiples instances of the status of the ones of the plurality of client properties repeatedly received at the server that overlap the set of client properties relevant to the task;
determining a time-based characteristic of the set of client properties based at least in part on an evaluation of the stored multiple instances of the status of the ones of the plurality of client properties repeatedly received at the server, wherein the time-based characteristic represents patterns identified over time of the ones of the plurality of client properties repeatedly received at the server the reports; and
determining a level of service for executing the task based at least in part on the time-based characteristic of the set of client properties.

16. The computer program product of claim 15, wherein determining the level of service comprises determining a first level of service if a value of the time-based characteristic is above a predetermined threshold.

17. The computer program product of claim 16, wherein:
the first level of service comprises a boosted level of service; and
the boosted level of service comprises executing the task using task applicability information of the set of client properties that is stored at the server at a time the task is run.

18. The computer program product of claim 17, wherein the time-based characteristic of the set of client properties comprises an update frequency.

19. The computer program product of claim 18, wherein determining the level of service comprises determining a secondary level of service if a value of the time-based characteristic is below a predetermined threshold.

20. The computer program product of claim 19, wherein:
the secondary level of service comprises a client-centric level of service;
the client-centric level of service comprises executing the task by confirming task applicability information of the set of client properties at a time the task is run; and
the time-based characteristic of the set of client properties comprises a minimum update time.

\* \* \* \* \*